Dec. 20, 1927.
C. C. FRANCE ET AL
1,653,005
TOILET FLOAT
Filed March 3, 1924
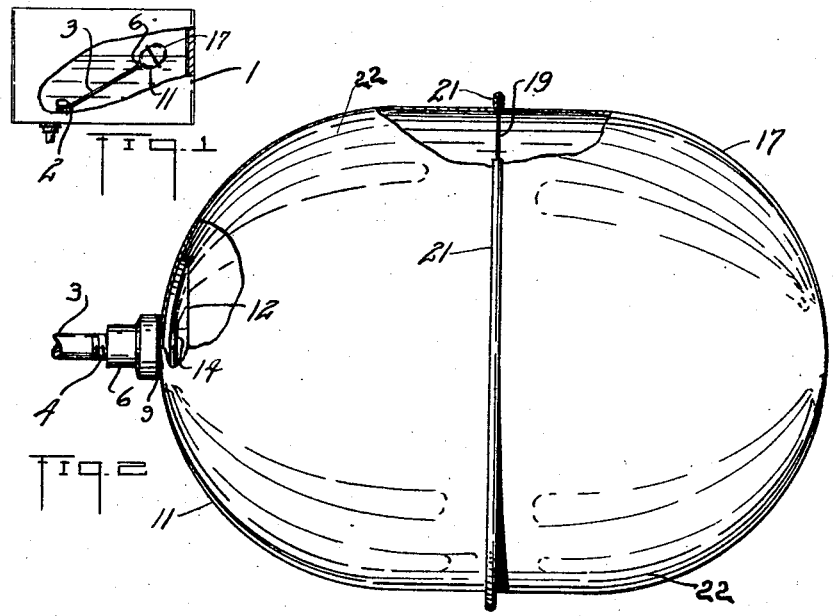
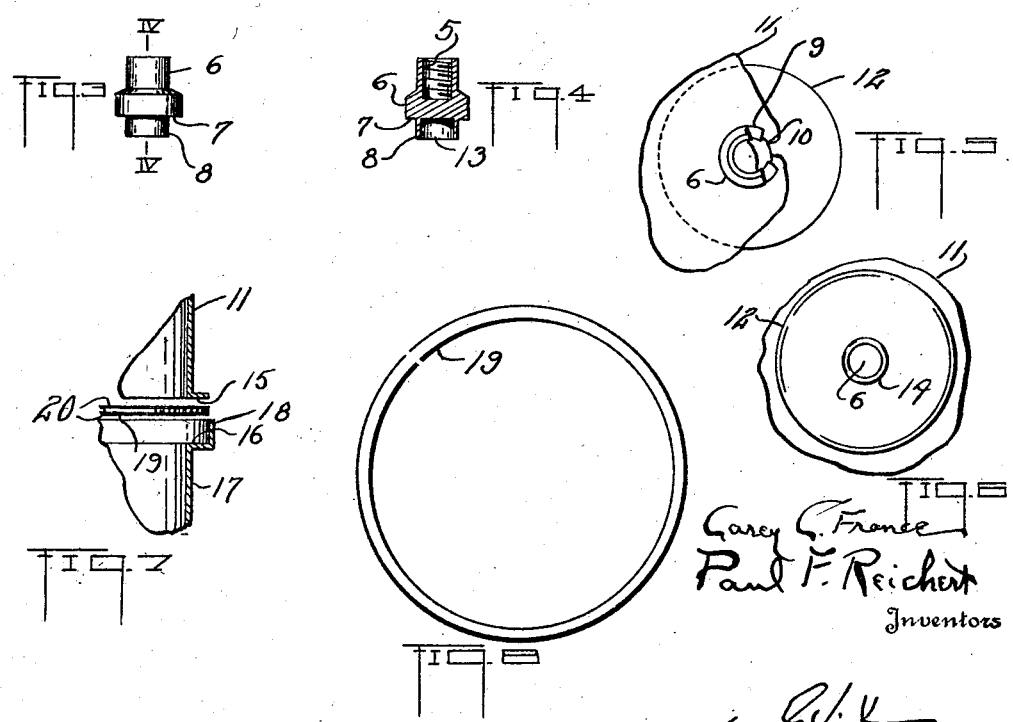
Garey C. France
Paul F. Reichert
Inventors
By Geo E Kirk
Attorney Patented Dec. 20, 1927.

1,653,005

UNITED STATES PATENT OFFICE.

CAREY C. FRANCE AND PAUL F. REICHERT, OF TOLEDO, OHIO.

TOILET FLOAT.

Application filed March 3, 1924. Serial No. 696,469.

This invention relates to mounting and sealing metallic chambers.

This invention has utility when incorporated in floats, especially for toilet flush tanks.

Referring to the drawings:—

Fig. 1 is a fragmentary view with parts broken away of an embodiment of the invention in a toilet flush tank;

Fig. 2 is a side elevation of the float of Fig. 1, parts being broken away;

Fig. 3 is a detail in side elevation of a mounting spud for the float of Fig. 1;

Fig. 4 is a section in the line IV—IV, Fig. 3;

Fig. 5 is a view of the spud from the outside, parts being broken away;

Fig. 6 is a view of the spud mounting from the inside, parts being broken away;

Fig. 7 is a section on an enlarged scale of the joint between the float sections as grouped for assembly, and Fig. 8 is a detail view of the gasket for the joint between the float sections.

Toilet flush tank 1 is shown as having valve 2 from which extends rod 3 having its threaded end 4 engaging threads 5 in spud 6. This spud 6 is shown as having shoulder 7 beyond which there protrudes extension 8. In assembly this extension 8 is thrust through rubber gasket 9, through opening 10 in float section 11, and through stiffening washer 12. As extending through this stiffening washer 12, due to concentric opening 13 in the spud 6, a riveting tool or die may be caused to act upon this extension 8 to bend such extension 8 as a continuous annular flange 14 opposing the shoulder 7 to form therebetween a groove for maintaining sealed assembly of this float section 11 with the spud 6. The compressible gasket 9 is effective against temperature change in holding the joint, while the washer 12 distributes the load strains from the rod 3 over a considerable area of the shell or float section wall 11. Furthermore the holding of these elements assembled due to this endless flange 14 is a uniform and substantial locking.

This float section 11 of sheet metal terminates in seat 15 opposing seat 16 of companion shell or float section 17. This companion shell 17 has its seat 16 bordered by flange 18 within which the seat 15 may slide. As a cheap and effective assembly a gasket 19 of fiber or paper is disposed between the seats 15, 16, and sealed therewith by an application of red lead in oil or other desirable sealing plastic or dryer. Accordingly this gasket 19 has coatings 20 of a sealing compound of red lead coacting with the respective seats 15, 16, and as the sections 11, 17, are drawn together by bending over the flange 18 as riveted joint forming flange 21, the float chamber is completed. This gasket is sealed by the metal against external exposure. There is a continuous endless riveting flange 21 at this joint, and there is the endless flange 14 at the mounting joint.

The entire structure as herein disclosed is one which may be economically produced, and of a maintained seal against a long period of usage.

Another feature material in reducing the manufacturing cost while maintaining utility of the float herein disclosed is the feature of the elongated polar axis over the less equatorial or seam axis. The blank for the seam axis thus is directly reduced in size as to the metal quantity. The additional depth of draw does not detract from the general strength and life of the float. The polar axis as longer directly shifts the center of lift action for the float as an effective longer arm for the lever. Accordingly the float may actually have decreased displacement and due to such longer effective arm, bring about lifting action comparable with a larger diameter float of spherical form. The fact that ribs 22 extend from the poles of the sections to merge out at the seam, is a rib feature giving rigidity to the float and permitting the depth of draw in the formation of these sections.

What is claimed and it is desired to secure by Letters Patent is:

1. A sheet metal float having a concave wall thereof provided with an opening therethrough, a float mounting spud having a tubular internally threaded portion terminating in an annular shoulder, and an extension from said shoulder aligning with said tubular portion and on the opposite side of the shoulder therefrom, said extension being assembled with said float and protruding through said float wall opening, and a load strain distributing and float wall stiffening concavoconvex washer on said extension, said washer on its convex side nesting in said concave wall as a seat and of an extent to provide a wall strengthening reinforcement in wall extent from said opening beyond said shoulder, said spud extension comprising an endless flange of less thickness than said shoulder and bent toward said washer concave side to lock the spud into sealed assembly with the float and clamp said washer into bracing relation for the float extent of the washer as opposing the float wall.

2. A sheet metal float section, a riveted spud mounting therefor, a companion float section, said sections having opposing seats, one of said seats having a flange extending over the other to be bent thereagainst, an endless paper gasket, and a sealing coating directly anchoring the gasket with said seats against inward shifting in float assembly, said flange coacting as a further sealing agent with said gasket in completing float assembly.

In witness whereof we affix our signatures.

CAREY C. FRANCE.
PAUL F. REICHERT.